(12) United States Patent
Schmidt et al.

(10) Patent No.: US 7,436,156 B2
(45) Date of Patent: Oct. 14, 2008

(54) VOLTAGE CONVERTER CIRCUIT PROVIDING AN USABLE OUTPUT VOLTAGE FROM A VERY LOW INPUT VOLTAGE

(75) Inventors: Frank Schmidt, Zomeding (DE); Gerd Böhm, Obing (DE)

(73) Assignee: Enocean GmbH, Oberhaching (DE)

( * ) Notice: Subject to any disclaimer, the term of this patent is extended or adjusted under 35 U.S.C. 154(b) by 9 days.

(21) Appl. No.: 11/527,048

(22) Filed: Sep. 25, 2006

(65) Prior Publication Data

US 2007/0132318 A1 Jun. 14, 2007

Related U.S. Application Data

(63) Continuation of application No. PCT/DE2005/000450, filed on Mar. 11, 2005.

(30) Foreign Application Priority Data

Mar. 26, 2004 (DE) ...................... 10 2004 015 004

(51) Int. Cl.
*G05F 1/613* (2006.01)

(52) U.S. Cl. ...................... 323/222; 323/266

(58) Field of Classification Search ................ 323/222, 323/259, 264, 266, 301, 344, 345, 347
See application file for complete search history.

(56) References Cited

U.S. PATENT DOCUMENTS

| 4,533,986 | A | * | 8/1985 | Jones | ........................... 363/17 |
| 5,161,097 | A | * | 11/1992 | Ikeda | ......................... 363/124 |
| 5,216,351 | A | * | 6/1993 | Shimoda | ..................... 323/224 |
| 5,565,761 | A | | 10/1996 | Hwang et al. | |
| 5,894,214 | A | * | 4/1999 | Jiang | ........................... 323/222 |
| 6,188,209 | B1 | | 2/2001 | Poon et al. | |
| 6,307,361 | B1 | | 10/2001 | Yaakov et al. | |
| 6,320,357 | B1 | * | 11/2001 | Peters et al. | ................ 323/222 |
| 6,373,725 | B1 | * | 4/2002 | Chang et al. | ............. 363/21.01 |
| 6,937,487 | B1 | * | 8/2005 | Bron | ........................... 363/60 |

(Continued)

FOREIGN PATENT DOCUMENTS

CH 16397 2/1898

(Continued)

OTHER PUBLICATIONS

Damaschke, J.M., "Design of a Low Input Voltage Converter for Thermoelectric Generator", IEEE Transactions of Industry Applications, vol. 33, No. 5, Sep./Oct. 1997.

*Primary Examiner*—Jeffrey L Sterrett
(74) *Attorney, Agent, or Firm*—Cohen Pontani Lieberman & Pavane LLP

(57) ABSTRACT

An arrangement comprising at least one electrical voltage source (1) and one first voltage converter circuit (2) with an output (3) and an input (4). In this arrangement, the electrical voltage source (1) is connected to the input (4) of the first voltage converter circuit (2) and the output (3) of the first voltage converter circuit (2) can be connected to an electrical load (5). An input circuit (6) comprising an electromechanical switching element (7) and an inductance (8) is formed and the switching element (7) automatically opens and closes once or several times in dependence on a physical quantity, wherein an output circuit (10) comprising a capacitive element is formed.

16 Claims, 2 Drawing Sheets

U.S. PATENT DOCUMENTS

| | | | |
|---|---|---|---|
| 7,068,016 B2 * | 6/2006 | Athari | 323/222 |
| 7,084,612 B2 * | 8/2006 | Zinn | 323/266 |
| 7,098,633 B1 * | 8/2006 | Brokaw et al. | 323/222 |
| 2002/0074976 A1 | 6/2002 | Kunii et al. | |
| 2004/0100232 A1 * | 5/2004 | Lefedjiev | 323/266 |
| 2006/0022648 A1 * | 2/2006 | Ben-Yaakov et al. | 323/222 |

FOREIGN PATENT DOCUMENTS

| | | |
|---|---|---|
| DE | 729 679 C | 12/1942 |
| DE | 39 21 955 A1 | 1/1991 |
| DE | 42 19 222 A1 | 1/1993 |
| JP | 10327578 A | 12/1998 |
| JP | 2003-134863 A | 9/2003 |

\* cited by examiner

VOLTAGE CONVERTER CIRCUIT PROVIDING AN USABLE OUTPUT VOLTAGE FROM A VERY LOW INPUT VOLTAGE

RELATED APPLICATIONS

This is a continuation of International Application No. PCT/DE2005/000450, filed on Mar. 11, 2005, which claims priority from German Patent Application No. 10 2004 015 004.4, filed on Mar. 26, 2004, the content of which is hereby incorporated by reference.

FIELD OF THE INVENTION

The invention relates to an arrangement comprising at least one electrical voltage source and a first voltage converter circuit which can be preferably used for the up conversion of low electrical voltages.

BACKGROUND OF THE INVENTION

Voltage sources based, for example, on the Seebeck effect generate electrical voltages which are formed in dependence on a temperature. The voltages generated thereby are very low and, due to the very low voltage values, can only be used in a very restricted way as a voltage source for operating other electrical circuits. The Seebeck effect describes that, if two solder joints between different materials having different temperatures are formed in a closed electrical conductor, an electrical current flows, the so-called thermocurrent. This thermocurrent can be measured for temperature differences of only 1 Kelvin and below. The resultant thermal voltage is dependent on the metals used, for example metal pairings. In principle, however, the thermal voltage of a single thermocouple is very low. To increase the voltage generated, it is a known procedure to operate thermocouples in a series circuit and thus to achieve higher output voltages. Since each individual one of the thermocouples has its own internal impedance, the series connection of the thermocouples also increases the total internal impedance disadvantageously. A higher output voltage is thus gained with the disadvantage of lower efficiency. This disadvantage can be transferred not only to thermocouples but also applies to other voltage sources which supply low or very low voltages. Since each voltage source has a certain internal impedance, connecting voltage sources in series also, of necessity, produces an addition of the internal impedances. Operating thermocouples in parallel, or constructing the thermocouples with a greater area, on the other hand, does not generate a higher voltage but a higher current and accordingly a higher thermocurrent. The parallel circuit advantageously improves the internal impedance since the internal impedance of the overall circuit is then advantageously reduced.

The disadvantageous factor is that known semiconductor circuit arrangements cannot be operated with the low voltages which can then be achieved. Semiconductor circuits need an electrical voltage which exceeds a threshold of at least 0.3 V. Above this value, semiconductor-based voltage converter circuits can also be used.

SUMMARY OF THE INVENTION

It is an object of the invention to provide voltage sources adapted to be able to convert an electrical voltage, which is lower than the threshold voltage value of known semiconductor voltage converters, into a voltage value usable for semiconductor circuits.

This and other objects are attained in accordance with one aspect of the invention directed to an arrangement comprising an electrical voltage source, a first voltage converter circuit with an output and an input, in which the electrical voltage source is coupled to the input of the first voltage converter circuit, a second voltage converter circuit, and switching means which electrically bypass the first voltage converter circuit and thus connect the second voltage converter circuit to the voltage source. The first voltage converter circuit comprises an input circuit including an electromechanical switching element and an inductance, wherein the switching element automatically opens and closes once or several times in dependence on a physical quantity, and an output circuit comprising at least one capacitive element. The output of the first voltage converter circuit is connected to an input of said second voltage converter circuit. An output of said second voltage converter circuit is adapted to be connected to an electrical load. The second voltage converter circuit is a semiconductor-based voltage converter circuit.

One embodiment of the invention is directed to an arrangement comprising at least one electrical voltage source which can be formed, for example, by a thermocouple, and a first voltage converter circuit with an output and an input. The voltage source is connected to the input of the first voltage converter circuit and the output of the first voltage converter circuit can be connected to an electrical load. The first voltage converter circuit contains an input circuit and an output circuit, the input circuit being formed with an electromechanical switching element and an inductance. The electromechanical switching element automatically closes and opens in dependence on a physical quantity, for example temperature, current, voltage or the like. Due to the opening and closing of the electromechanical switching element, a voltage is induced across the inductance of the input circuit. Depending on the design of the inductance, the voltage induced is sufficient for transporting charge carriers from the input circuit of the voltage converter circuit into the output circuit of the voltage converter circuit. The output circuit of the voltage converter circuit has a capacitive element which stores the electrical charges.

It is advantageous that an electromechanical switching element, in contrast to a semiconductor-based switching element, can be dimensioned and constructed in such a manner that it responds even with the lowest exciter signals.

In an advantageous embodiment of the invention, the input circuit is designed with such extremely low resistance that even with very low voltages, for example voltages of less than 0.3 V, currents flow which are sufficiently large for inducing in the coil of the input circuit, due to the sudden change in the current flow caused by the electromechanical switching element, just such sufficient voltages.

The triggering parameter of the electromechanical switching element can be varied. For example, triggering can occur at a certain temperature, pressure, voltage, current intensity or the like. In the case of electrical current or voltage, the source for this electrical current or voltage can be the voltage source connected to the input side of the voltage converter circuit. If the electromechanical switching element is connected in series with the inductance, a rapid interruption of the current circuit in the switch leads to a higher induced voltage in the coil of the input circuit.

In a further advantageous embodiment, the electromechanical switching element is formed by an electromagnetic relay. The inductance in this embodiment is ideally formed by the exciter coil of the relay. A switching element which is constructed as normally-closed contact then forms the electromechanical switching element in conjunction with the exciter coil of the relay. If the switching element is also included in the exciter circuit of the relay, this leads to an effect which can be called self-decaying. That is to say, when a current flows through the exciter coil, the relay operates, as a result of which the normally-closed contact is opened. This opening of the contact leads to an immediate current drop in the exciter coil where it induces an electrical voltage which transports charge carriers into the output circuit, and the relay drops off. As a result, the contact closes again and the relay operates again and the process begins from the top. Thus, a pulsating direct voltage is formed with an electromechanical switching element, which makes it possible to pump charge carriers to the capacitive element of the output circuit. Such a switching arrangement could thus be called an electromechanical charge pump.

In an advantageous embodiment, the relay is formed by a reed relay. Reed relays need very low forces for operating the contacts and are especially suitable for this reason.

To optimize the switching arrangement, the inductance is formed as a transformer with a low-resistance primary winding and a high-resistance secondary winding in an advantageous embodiment. In this arrangement, the low-resistance primary winding is in a particularly advantageous manner an exciter winding of the relay. As a result, the relay can be dimensioned independently of the induction coil, the inductance and separate optimized dimensionings can thus be found for each element. Thus, a low-resistance primary coil manages with a low voltage for operating the relay or the relay contacts, respectively, but the voltage which can be induced in this coil is also low. It is advantageous, therefore, to use a high-resistance coil, also having more turns, as a secondary coil in order to achieve the highest possible induced voltage.

In a further advantageous embodiment, the primary winding and the secondary winding are formed by a winding with a center tap. This represents a so-called autotransformer. Separate optimization of the two coils is thus still possible even with lower space requirement and the lower production costs possible by this means.

In a further advantageous embodiment, the input circuit and the output circuit are connected to one another via a diode which prevents charge carriers from the output circuit or from the capacitance of the output circuit, respectively, from flowing back into the input circuit. The diode is arranged in such a manner that charge carriers can flow from the input circuit to the output circuit.

At the output of the first voltage converter circuit, a load, particularly a semiconductor-based load, can be operated. This is possible since the electromechanical element of the first voltage converter circuit can be dimensioned in such a manner that it begins to operate even at voltages below 0.3 V. Otherwise, a load, particularly a semiconductor-based load, cannot be operated with the existing voltage of 0.3 V or lower.

Thus, a second voltage converter circuit can be optionally also operated as semiconductor voltage converter circuit at the output of the first voltage converter circuit.

With suitable design, the semiconductor voltage converter circuits, after an electrical threshold voltage has been exceeded once, can also be operated below this threshold voltage at the input of the semiconductor-based voltage converter circuit. The first voltage converter circuit could thus be considered as initialization circuit for a second voltage converter circuit in that it supplies a higher threshold voltage for a short time. In an advantageous embodiment, therefore, the arrangement between the two voltage converter circuits is selected to be such that the first voltage converter circuit can be bypassed in dependence on operating parameters of the second voltage converter circuit or in dependence on the operability of the second voltage converter circuit. This is possible, for example, by means of correspondingly constructed change-over switching elements or a toggle switch which can be operated on the basis of a parameter from the second voltage converter circuit. For example the switching means can be based on semiconductor circuits working as a toggle switch where the operating current is based on the output current of the second voltage converter circuit. Ore the switching means can be based on electromechanical switches for example a relay which is operated by the output current of the second voltage converter circuit.

As a consequence, it is not an arbitrary chain of concatenated voltage converter circuits which is obtained but instead a voltage source, the low output signal of which is the input signal for an initialization circuit. This is formed by the first voltage converter circuit with electromechanical element. At the output of which, a second voltage converter circuit, particularly a semiconductor voltage converter circuit, is connected. If the voltage at the voltage source is high enough for operating the semiconductor voltage, after a threshold voltage is reached, even at lower voltages than the threshold voltage, the switching elements for bypassing the first voltage converter circuit are actuated, initiated by the second semiconductor voltage converter circuit. By this means, a voltage converter circuit is advantageously formed even for the lowest voltages which is capable of converting these into higher voltages without using more energy since the first voltage converter circuit is switched off or can be switched off, respectively.

In a further advantageous embodiment, a current limiting element is implemented in the output circuit of the first and/or optionally also the second voltage converter circuit. It is the object and purpose of this current limiting element to limit the maximum output current, which can be taken from the first and the second voltage converter circuit, respectively, by a load, to a maximum value so that the stability of the first or second voltage converter circuit does not suffer by too much current being consumed.

DETAILED DESCRIPTION OF THE DRAWINGS

Figure 1:
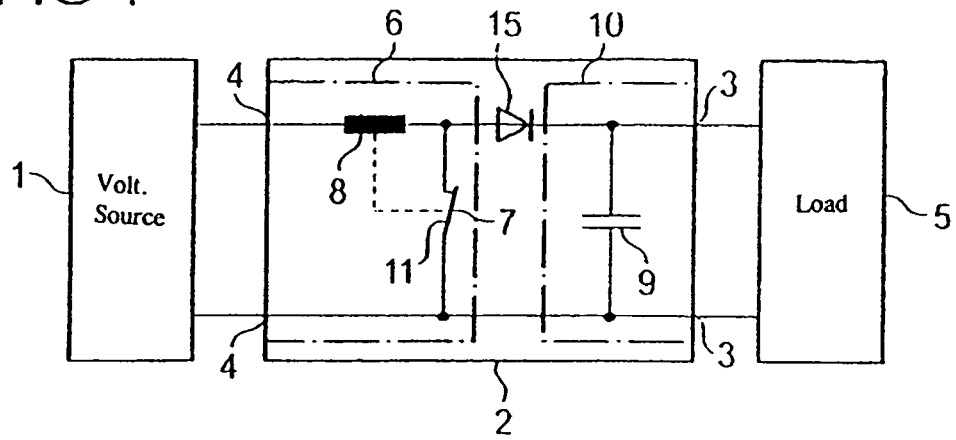
FIG. 1 shows an arrangement comprising a voltage source, a first voltage converter circuit and a load.

FIG. 1 diagrammatically shows a voltage source 1 formed from one or more thermocouples. Various energy converters can be used as a voltage source. Some of the suitable energy converters are named in the following enumeration:
thermocouple,
electrochemical energy converter,
electromechanical energy converter,
fuel cell, and
converter converting electromagnetic radiation into electrical energy.

FIG. 1 also shows a first voltage converter circuit 2 which has an output 3 and an input 4. At the input 4 of the first voltage converter circuit 2, the voltage source 1 is connected. If the voltage source 1 is, for example, a thermocouple, the electrical voltage obtained from it is very low, that is to say less than 0.3 V. At the output 3 of the first voltage converter circuit 2, a load 5 is connected. If the load 5 is, for example, a semiconductor circuit, it cannot be operated directly with voltages supplied by the voltage source 1. The input circuit 6 of the voltage converter circuit 2 contains an inductance 8 and a switching element 7. The switching element 7 is opened and closed again by external parameters, that is to say heat, light, current, voltage or the like, so that an interruption of the input circuit 6 leads to an induction in the coil 8. Due to this induction, charge carriers pass to the capacitive element 9 of the output circuit 10. The electromechanical switching element 7 opens and closes frequently enough until the number of charge carriers at the capacitive element 9, and thus the voltage in the output circuit 10, is high enough for operating the load 5.

Figure 2:
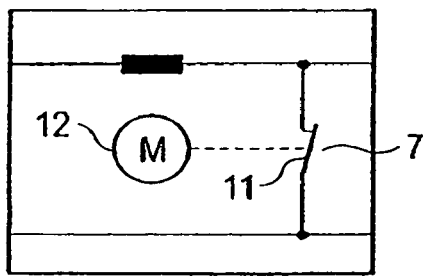
FIG. 2 shows a detail of the first voltage converter circuit.
Figure 3:
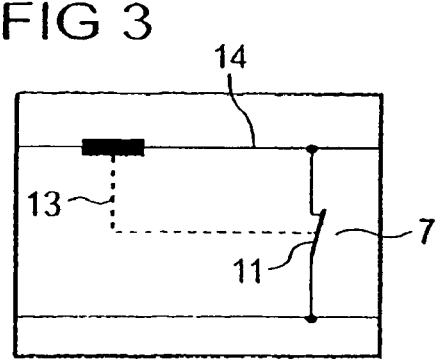
FIG. 3 shows a detail in another embodiment of the first voltage converter circuit.

FIG. 2 shows a more detailed representation of the electromechanical switching element, wherein a switching element 11 is formed as normally-closed contact and an electromotive actuating element 12 opens and closes the switching element. This electromotive actuating element can be operated by physical parameters such as a change in temperature, light intensity, voltage, current or the like. The advantageous embodiment of the same circuit, shown in FIG. 3, shows that the inductance 8 is included as an exciter coil for a relay which is connected in such a manner that, when current flows through the coil, the relay operates and, as a result, the switching element 11 opens. The switching element 11 thus interrupts the exciter circuit 14 of the relay 13 as a result of which the latter decays and the switch is closed again.

A so-called self-releasing relay is thus formed as a result of which continuous inductions in the coil lead to charges being pumped in the direction of the capacitive element 9.

Figure 4:
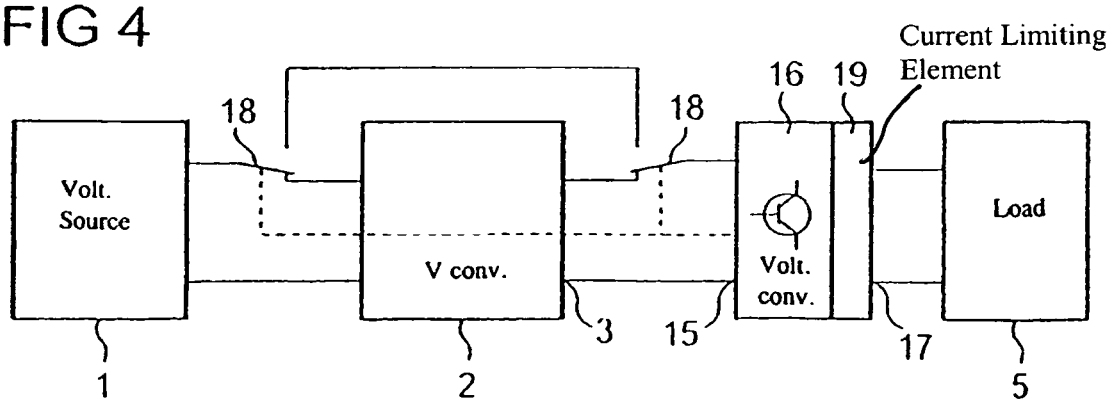
FIG. 4 shows an arrangement of voltage source, first and second voltage converter circuit, and a load.

FIG. 4 then shows an arrangement which is extended by a further voltage converter circuit 16. In this arrangement, the voltage converter circuit 16 is arranged between the load 5 and the first voltage converter circuit 2. The load 5 is now connected to an output 17 of the second voltage converter circuit 16. An input 15 of the second voltage converter circuit 16 is connected to the output 3 of the first voltage converter circuit 2. It is thus possible, to use the voltage converter circuit 2 for converting the originally very low voltage of the voltage source 1 to such a magnitude that the second voltage converter circuit 16 constructed as a semiconductor voltage converter circuit can be operated. The latter is designed in such a manner that, once it is operated, it is capable of generating, and holding, from a very low input voltage a voltage which is sufficiently large for operating it, so that it can still be operated even when the input voltage drops below the switch-on threshold voltage of, for example, 0.3 V at the voltage source 1. This means that even when the voltage drops below the actual threshold voltage for operating the second voltage converter circuit 2, the latter will continue to work. It is thus possible to separate the first voltage converter circuit 2 from the voltage source 1 and the second voltage converter circuit 16 until the voltage drops below a value which also prevents the second voltage converter circuit 16 from operating. For this purpose, switching means 18 are introduced which enable the first voltage converter circuit 2 to be bypassed. If the second voltage converter circuit 16 fails due to the voltage at the voltage source 1 being too low, the switching means 18 will again switch in the first voltage converter circuit 2. This then causes the voltage to be up converted and the threshold voltage at the input of the second voltage converter circuit 16 to be again exceeded.

Suitable design of the first voltage converter circuit 2 makes it possible to achieve a situation where, with a falling electrical voltage below a value at which the second voltage converter circuit 16 can no longer be operated, the first voltage converter circuit can also not be operated. It is thus possible to operate the first voltage converter circuit 2 as a pure initialization circuit for the second voltage converter circuit. The first voltage converter circuit then only responds from a voltage at which it is possible to operate the second voltage converter circuit but not to "start" it. The advantageous factor in this is the increase in the service life of the first voltage converter circuit which can be achieved by this means since it is always operated only briefly for generating a short switch-on voltage signal of adequate amplitude for the second voltage converter circuit 16.

Figure 5:
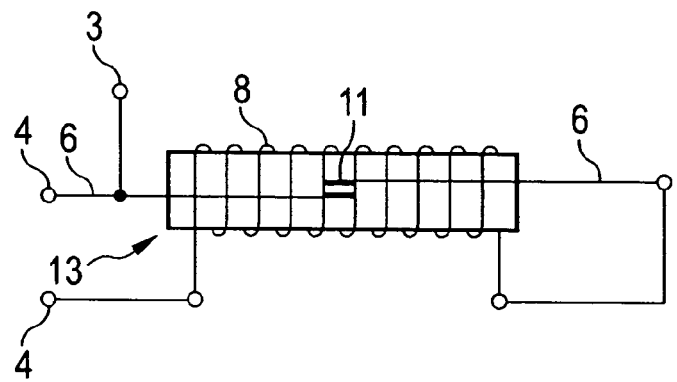
FIG. 5 shows a reed relay in a diagrammatic representation.

FIG. 5 shows an exemplary embodiment of a reed relay which can be used as relay 13. The advantages of a construction with a reed relay are particularly the low forces required for operating a read contact.

Figure 6:
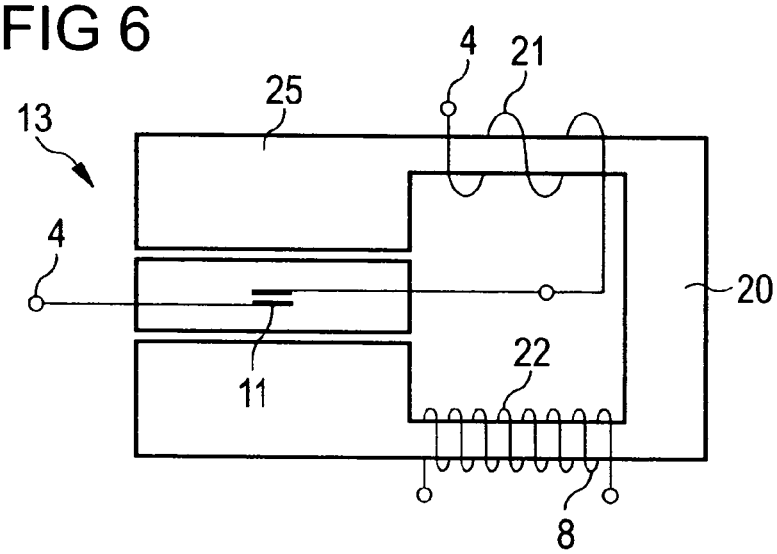
FIG. 6 shows a reed relay, with transformer in a diagrammatic representation.
Figure 7:
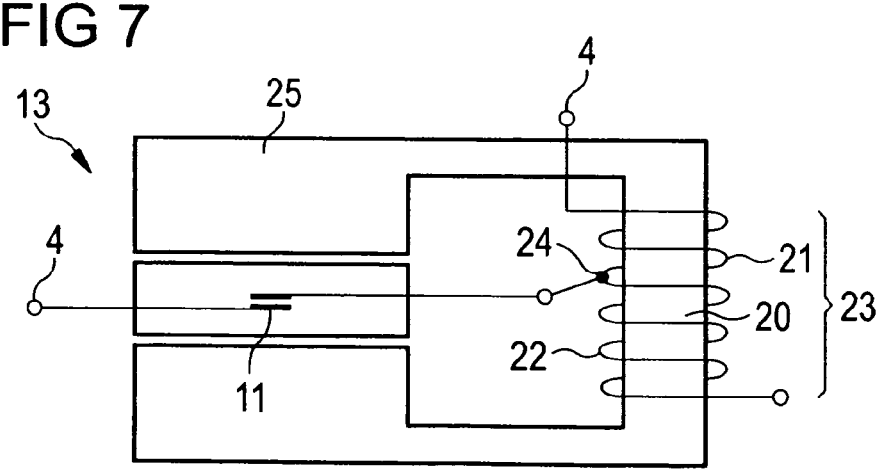
FIG. 7 shows a reed relay with autotransformer

FIGS. 6 and 7 show an exemplary embodiment comprising a transformer 20. In this arrangement, the primary coil 21 can be advantageously dimensioned separately from the secondary coil 22. The secondary coil supplies charge carriers to the capacitive element 9 of the output circuit 10 by means of induction. In FIG. 7, an exemplary embodiment as so-called autotransformer is shown which is advantageous particularly with respect to the space requirement and production costs. In this arrangement, the inductance is formed with a ferromagnetic core 25 and one or two coils, respectively, as in the exemplary embodiment of FIG. 6. A center tap 24 makes it possible to form a different number of turns for the primary coil 21 and the secondary coil 22.

A current limiting element 19 which is arranged, for example, in the second voltage converter circuit 16 in the output circuit limits to a predetermined value the current which can be removed by the load 5. The voltage source 1 which is formed, for example, by a low-resistance thermoelectric transducer or thermocouple, respectively, or also a fuel cell or another voltage source with low output voltage, thus delivers voltage at the input of the first voltage converter circuit 2 as a result of which an initialization voltage is formed across the electromagnetic switching element at the output 3 of the first voltage converter circuit. That is to say the low input voltage is raised for a short time by such an amount that the semiconductor-based second voltage converter circuit 16 can begin to operate. This semiconductor-based voltage converter circuit 16, which can be formed by a so-called switched-mode converter or also by an oscillator, is designed in such a manner that it can also operate at very low voltages such as, for example, less than 0.3 V, once it has started.

This second voltage converter circuit is started by the initialization pulse which is present as slightly increased voltage at the output of the first voltage converter circuit 2. For operating, the first voltage converter circuit 2 is designed for essentially high currents, and not for high voltages. This is achieved by designing the input circuit with low resistance, which is achieved by a coil or by a low-resistance transformer on the primary side. Furthermore, an electromechanical switch, which is also constructed with low resistance, is included in this low-resistance input circuit. With respect to the switch, the low-resistance property relates to the contact resistance at the switching contacts.

It is thus advantageous to use relays constructed as reed relays or else other switches which do not need high voltages but rather high currents for the operation. These are, for example, bimetallic switches or special semiconductor switches. As soon as the energy source or the voltage source 1 initiates a current through the coil, the latter builds up a magnetic field in which energy is stored. If the circuit is now interrupted by the switch, the collapsing magnetic field at the coil generates an induction voltage which, when suitably designed, is much higher than the input voltage. This voltage charges up the capacitive element 9 of the output circuit of the first voltage converter circuit 2. This process can be repeated until the voltage level at the capacitive element of the output circuit of the first voltage converter circuit 2 is sufficient for initializing the subsequent second voltage converter circuit 16. Once this second voltage converter circuit 16 is running, it supplies its own voltage necessary for operating it. It also supplies a direct voltage by means of which semiconductor circuits at its output 17 can be operated. For example, the switching element 11 is constructed as a normally-closed contact which opens as soon as a current through said low-resistance coil exceeds a particular value. When this happens, the magnetic field generated by the coil collapses and generates in it or in another coil previously carrying the magnetic field a voltage which is higher compared with the input voltage. This can be coupled out via the diode and charges a storage capacitor, the capacitive element 9. Once the magnetic field has collapsed, the relay 13 closes again by itself and the process starts again from the top. This is repeated until the voltage and the amount of energy in the capacitive element 9 are sufficient for "starting" a semiconductor-based second voltage converter circuit 16. When this semiconductor-based second voltage converter circuit is then running steadily, it is connected directly to the voltage source 1 and bypasses for the first voltage converter circuit 2 via the switching means 18.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. An arrangement comprising:
   an electrical voltage source;
   a first voltage converter circuit with an output and an input, in which the electrical voltage source is coupled to the input of the first voltage converter circuit;
   a second voltage converter circuit; and
   switching means which electrically bypass the first voltage converter circuit and thus connect the second voltage converter circuit to the voltage source;
   wherein the first voltage converter circuit comprises:
       an input circuit including an electromechanical switching element and an inductance, wherein the electromechanical switching element is formed by an electromagnetic device having a normally-closed contact, the electromagnetic device being included in an exciter circuit of a relay which automatically opens and closes once or several times in dependence on a physical quantity, and
       an output circuit comprising at least one capacitive element, and
   wherein the output of the first voltage converter circuit is connected to an input of said second voltage converter circuit;
   wherein an output of said second voltage converter circuit is adapted to be connected to an electrical load; and
   wherein the second voltage converter circuit is a semiconductor-based voltage converter circuit.

2. The arrangement as claimed in claim 1, wherein the input circuit has a very low resistance.

3. The arrangement as claimed in claim 1, wherein the physical quantity is at least one of a temperature, an electrical quantity, a light intensity and a gas.

4. The arrangement as claimed in claim 3, wherein the electrical quantity is an electrical voltage and/or an electrical current, outputted by the voltage source.

5. The arrangement as claimed in claim 1, wherein the electromechanical switching element is connected in series with the inductance.

6. The arrangement as claimed in claim 1, wherein the electromechanical switching element includes a switching element and an electromotively operated actuator.

7. The arrangement as claimed in claim 1, wherein the voltage source is at least an energy converter which converts non-electrical energy to a low electrical voltage level.

8. The arrangement as claimed in claim 7, wherein the energy converter is at least one of a thermocouple, an electrochemical energy converter, an electromechanical energy converter, a fuel cell, and a converter which converts electromagnetic radiation into electrical energy.

9. The arrangement as claimed in claim 1, wherein the relay is a reed relay.

10. The arrangement as claimed in claim 1, wherein the inductance is formed as a transformer with a low-resistance primary winding and a high-resistance secondary winding, wherein the low-resistance primary winding forms an exciter winding of the relay.

11. The arrangement as claimed in claim 10, wherein the primary winding and the secondary winding are formed by a winding with a center tap.

12. The arrangement as claimed in claim 1, wherein the input circuit is connected to the output circuit by means of a diode, so that charge carriers can flow from the input circuit to the capacitive element of the output circuit.

13. The arrangement as claimed claim 1, wherein the inductance is formed by an exciter coil of the relay.

14. The arrangement as claimed in claim 1, wherein the switching means is adapted to be activated in dependence on an electrical parameter of the second voltage converter circuit.

15. The arrangement as claimed in claim 14, wherein the electrical parameter is given by the second voltage converter circuit operating.

16. The arrangement as claimed in claim 1, wherein a current limiting device is included in the output circuit of the first and/or the second voltage converter circuit so that a predetermined maximum current intensity cannot be achieved at the output of the voltage converter circuit.

* * * * *